March 3, 1964  C. J. KETTLER  3,123,763
CONTROL CIRCUIT FOR VOLTAGE REGULATOR
Filed April 3, 1962
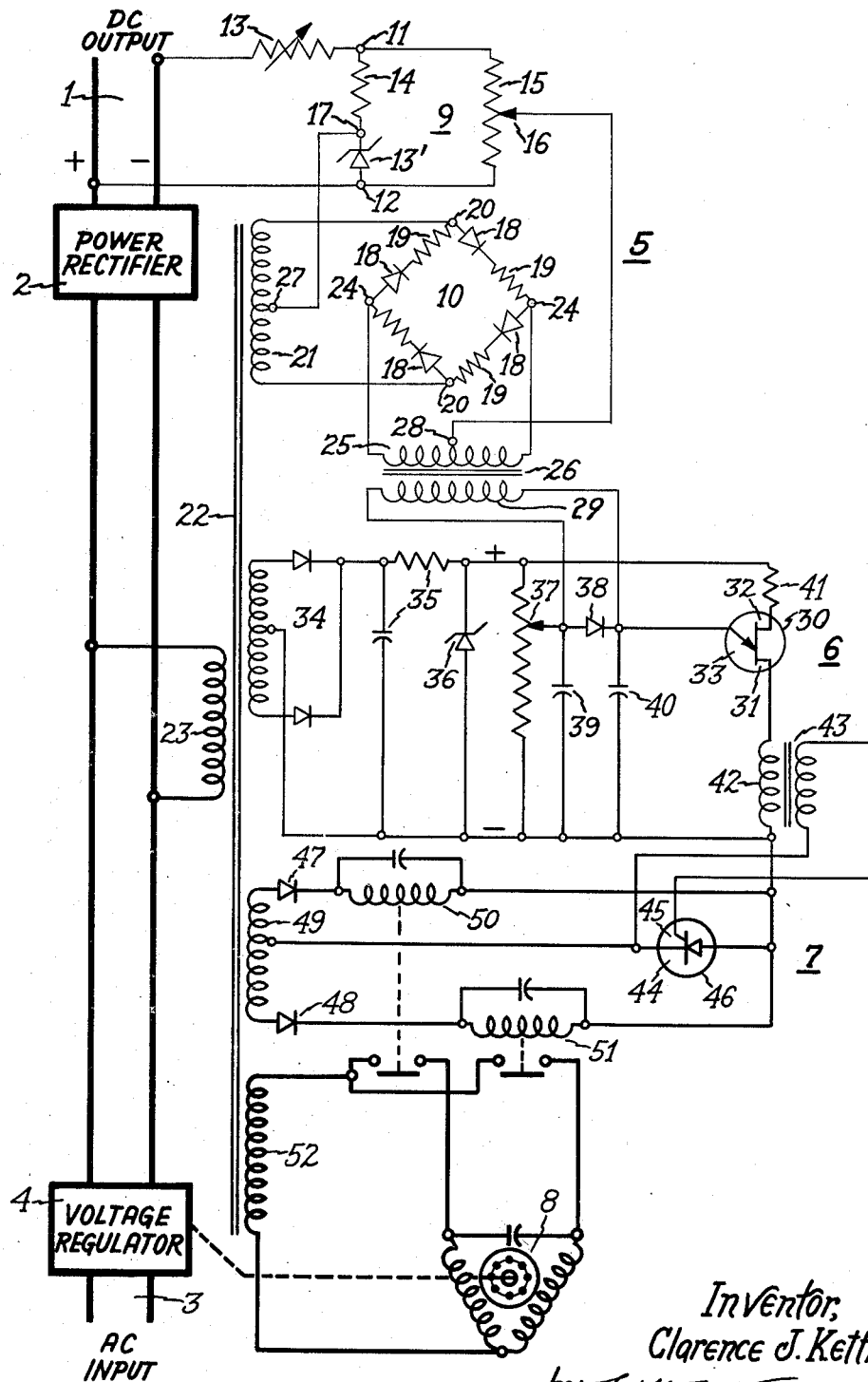
Inventor,
Clarence J. Kettler,
by Gilbert P. Tarleton
His Attorney.

3,123,763
CONTROL CIRCUIT FOR VOLTAGE REGULATOR
Clarence J. Keitler, Stockbridge, Mass., assignor to General Electric Company, a corporation of New York
Filed Apr. 3, 1962, Ser. No. 184,715
4 Claims. (Cl. 323—22)

This invention relates to control circuits and more particularly to improvements in bidirectional dead band control systems.

An application, Serial Number 184,711, filed April 3 1962, in the name of Tage P. Sylvan, and assigned to the same assignee, is directed to an alternating voltage responsive bidirectional dead band control system embodying solid state transistor type switching devices.

A primary object of this invention is to provide means for making the Sylvan system responsive to a direct current signal particularly a null signal whose magnitude increases from zero and whose polarity reverses with deviations above and below the desired value of the undirectional voltage.

Briefly stated, this invention comprises a nonlinear direct current bridge circuit for modulating an alternating current excited rectifier ring circuit to produce a phase controlled null type alternating current error signal.

Other objects and advantages of the invention will be better understood from the following description taken in connection with the accompanying drawing and its scope will be pointed out in the appended claims.

Referring now to the single figure of the accompanying drawing, which illustrates diagrammatically a preferred embodiment of the invention, there is shown therein by way of example a direct current circuit 1 whose voltage is to be maintained substantially constant. This circuit may for example be the output circuit of a power rectifier 2 supplied from an alternating current input circuit 3 through a voltage regulator 4 for any suitable type such as a transformer type regulator of either the induction variety or the tap changing variety. The control system may be considered as consisting of three main parts, namely, an error sensing and signal producing circuit 5, an intermediate amplifying stage 6 and a phase sensitive solid state switching device circuit 7 for controlling direction of operation of a servo motor 8 for driving the regulator 4.

The principal features of novelty are in the subcircuit 5, subcircuits 6 and 7 being generally similar to what the above mentioned Sylvan patent application is directed to although there are some modifications in each which will be described in detail hereafter.

The part 5 in turn consists of two main elements, a nonlinear bridge circuit 9 and a so-called ring modulator 10. The bridge 9 has input terminals 11 and 12 connected respectively to opposite sides of the direct current output circuit 1 whose voltage is to be maintained constant. A voltage level adjusting rheostat 13 may be serially connected between either of the input terminals and the main circuit 1. The bridge 9 has at least one nonlinear characteristic impedance element which may be of any suitable type such as a thermistor or lamp filament, but I prefer the use of a zener diode 13', this being a device well-known in the art which has a so-called avalanche conductive condition in which its voltage is relatively independent of its current. The other elements of the bridge may be a resistor 14 and a potentiometer 15 having a sliding contact 16 which may also be used as a voltage level adjuster for the control system. In other words, the functions of rheostat 13 and slider contact 16 are generally similar. The output terminals of the bridge 9 are the slider 16 and a terminal 17.

By suitably adjusting either rheostat 13 or potentiometer 15—16 the bridge may be electrically balanced at any particular desired voltage of the direct current circuit 1 in which case no voltage will appear between the output terminals 16 and 17. If the voltage of circuit 1 deviates from this desired valve in either direction, the bridge will become unbalanced and a undirectional potential will appear between the output terminals 16 and 17 the polarity of which error signal will depend on the direction of the deviations that is to say whether they are above or below the desired value. This is a null signal error sensing circuit in that when the regulated condition is normal there is no error signal.

For amplifying and inverting the error signal of the bridge 9 there is provided what is called a ring modulator 10 consisting essentially of four substantially identical diode rectifiers 18 serially connected anode to cathode in a closed ring or loop. Impedance matching and current limiting resistors 19 may be connected in series with each diode. This ring modulator has a pair of input terminals 20 connected to be energized by an alternating potential such as from a secondary winding 21 of a supply transformer 22 whose primary winding 23 is shown connected across the power circuit between the power rectifier 2 and the voltage regulator 4. The ring circuit also has a pair of alternating current output terminals 24 connected across the primary winding 25 of an output transformer 26. The winding 21 has a midtap 27 and the winding 25 has a midtap 28 to which the output terminals 17 and 16 of the nonlinear bridge 9 are respectively connected. In other words, the midtaps 27 and 28 constitute signal input terminals of the ring modulator circuit.

The operation of the ring modulator is as follows.

Assuming there is no undirectional error signal from the bridge 9 applied between the midtaps 27 and 28 then during half cycles of voltage of one polarity of the supply winding 21 the two right-hand diode rectifiers 18 break down in the forward direction and during opposite half cycles of the voltage of supply winding 21 and the left-hand pair of diode rectifiers 18 break down in the forward direction. Inasmuch as the diodes are similar they break down simultaneously so that no voltage appears between the output terminals 24.

Assuming now that the bridge 9 becomes unbalanced in such a direction that the terminals 16—28 become positive relative to the terminals 17—27 then during the half cycles when the upper terminal 20 is positive with respect to the lower terminal 20 more forward voltage will be impressed across the lower right-hand diode 18 than across the upper right-hand diode 18 so that the former will break down first causing a pulse of current to flow to the right in the winding 25 from the midtap 28. During the next half cycle when the voltage of winding 21 reverses more forward voltage will appear across the upper left-hand diode than across the lower left-hand diode so that the former will break down first and permit an impulse of current to flow through the winding 25 from the midtap 28 toward the left. Thus an alternating voltage will be induced in a secondary winding 29 of the transformer 26.

If now the bridge 9 becomes unbalanced in the opposite direction so that terminals 17—27 become positive relative to terminals 16—28 then when the polarity of the upper terminal 20 is positive with respect to the lower terminal 20, the signal voltage will add to the voltage of the winding 21 so far as the upper right-hand diode 18 is concerned so it will break down first and cause an impulse of current to flow in the right-hand half of the winding 25 toward the midtap 28. Likewise during the next half cycle when the polarity of the winding 21 and the terminals 20 reverse the excess voltage will be across the lower left-hand diode 18 so that it will break down first and cause an impulse of current to flow through the left-hand half of the winding 25 toward the midtap 28. Thus an alternating voltage of reverse phase will be induced in the secondary winding 29 under this condition of unbalance of the bridge 9.

The reversible phase or polarity alternating null signal from the winding 29 is used to control the firing of a unijunction transistor 30 sometimes known in the art as a double base solid state diode. Such devices are well known in the art and as shown the unijunction transistor 30 comprises a first base 31 and a second base 32 and an emitter 33. A regulated source of unidirectional potential comprising a biphase rectifier 34 whose output is filtered by an R-C circuit 35 and whose output is regulated by a zener diode 36 serves to apply positive potential to the base 32 through a resistor 41 and negative potential to the base 31.

The emitter 33 has applied to it an intermediate unidirectional potential by means of a potentiometer 37, which is adjustable to set the bandwidth or dead band of the entire control system. This potential is applied through a diode 38, the output of the signal transformer 26 being connected across this diode. The potential is set so that the bias on the emitter 33 is below the firing voltage for the unijunction transistor 30. If now the signal from the transformer 26 is such that its positive half cycles when added to the unidirectional bias reaches the firing point of the unijunction transistor the latter will fire thus discharging the capacitors 39 and 40 through the primary winding 42 of a pulse transformer 43.

The output of the pulse transformer 43 is applied between the cathode 44 and the gate 45 of a silicon controlled rectifier 46 whose anode-cathode circuit is in the neutral part of a biphase rectifier circuit consisting of separate diodes 47 and 48 energized by a midtapped supply winding 49 on the supply transformer 22. Thus the diodes 47—48 prevent current from flowing in their respective circuits except when the silicon controlled rectifier 46 fires and its firing is timed by the firing of the unijunction transistor 30 which in turn is timed by the reverse polarity signal from the part 5 of the system.

Control elements of any suitable type such as relays 50 and 51 are connected respectively in series with the diodes 47 and 48 and they in turn control circuits for energizing the reversible capacitor motor 8 in opposite directions from a suitable source of current supply such as a winding 52 on the supply transformer 22.

The particular merit of the ring modulator in this system is that its impedance is high before the diodes 18 conduct currents and certain of the diodes do not conduct current until they have sampled the unidirectional error signal from the bridge 9. Hence they do not load the sensor 9 until the output state of the sensor has been accounted for. An additional merit is that the excitation or carrier energization supplied by the winding 21 to the ring can be made large enough to insure firing the unijunction transistor 30 near the beginning of the alternating wave that excites the silicon controlled rectifier 45. Hence full power is transmitted to the output relays 50 and 51. This is in contrast to a direct alternating error signal which will fire the unijunction transistor 30 at or near its full value and hence delays the firing of the silicon controlled rectifier to about half of a particular half wave of power excitation. Substantial voltage gain is possible from the ring modulator by increasing the modulating voltage to several times the forward drops of the ring diodes 18. This works out well because the loading effect of the unijunction transistor 30 is small.

The use of a pulse transformer 43 to drive the gate 45 of the silicon controlled rectifier 46 permits freedom in positioning grounds and in selecting the polarity directions of the circuit including diodes 47 and 48.

The transformer 26 can be made a step-up transformer. This enhances the sensitivity of the control to line voltage so that a very narrow dead band can be maintained if desired.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. Means for sensing deviations in the voltage of a direct current circuit from a desired value and converting them into an alternating signal voltage whose magnitude is proportional to said deviations and whose phase reverses when the direction of said deviations reverses comprising, in combination, an impedance bridge at least one of whose impedance elements has a nonlinear voltage-ampere characteristic, said bridge having a pair of input terminals for connection to said direct current circuit and a pair of output terminals, and a ring modulator having a pair of alternating current input terminals in addition to a pair of direct current input terminals and a separate pair of alternating current output terminals, said output terminals of said bridge being connected respectively to said direct current input terminals of said ring modulator.

2. Means for sensing deviations in the voltage of a direct current circuit from a desired value and converting them into an alternating signal voltage whose magnitude is proportional to said deviations and whose phase reverses when the direction of said deviations reverses comprising, in combination, an impedance bridge at least one of whose impedance elements is a zener diode, said bridge having a pair of input terminals for connection across said direct current circuit and a pair of output terminals, means including four rectifier diodes serially connected anode to cathode in a closed ring having two pairs of diagonally opposite terminals, an alternating current supply winding connected between one of said pairs of diagonally opposite terminals and having a midtap, and an alternating current output winding connected between the other of said pairs of diagonally opposite terminals and having a midtap, said output terminals of said bridge being connected respectively to said midtaps.

3. In combination, a direct current circuit whose voltage is to be regulated, a nonlinear bridge circuit having input terminals connected to be responsive to the voltage of said circuit and having output terminals, said bridge being balanced at a desired normal value of said voltage whereby deviations of said voltage from said normal value will produce a unidirectional voltage across said output terminals whose magnitude is proportional to said deviations and whose polarity depends on the direction of said deviations, means for inverting and amplifying the unidirectional voltage across said output terminals comprising a ring circuit of four diode rectifiers connected anode to cathode around said ring, said ring having two pairs of diagonally opposite terminals, an alternating current supply transformer having a secondary winding connected between one pair of said diagonally opposite terminals, said secondary winding having a midtap, an output transformer having a primary winding connected between the other pair of diagonally opposite terminals, said primary winding having a midtap, the output terminals of said nonlinear bridge circuit being connected respectively to said midtaps whereby said output transformer produces an alternating voltage signal whose magnitude is proportional to said deviations in voltage of said direct current circuit and whose phase depends on the direction of said deviations, and means responsive to said alternating voltage signal for regulating the voltage of said direct current circuit so as to cancel said deviations.

4. In combination, a direct current circuit whose voltage is to be regulated, a nonlinear bridge circuit having input terminals connected to be responsive to the voltage of said circuit and having output terminals, said bridge being balanced at a desired normal value of said voltage whereby deviations of said voltage from said normal value will produce a unidirectional voltage across said output terminals whose magnitude is proportional to said deviations and whose polarity depends on the direction of said deviations, means for inverting and amplifying the unidirectional voltage across said output terminals comprising a ring circuit of four diode rectifiers connected anode to cathode around said ring, said ring having two pairs of diagonally opposite terminals, an alternating current supply transformer having a secondary winding connected between one pair of said diagonally opposite terminals, said secondary winding having a midtap, an output transformer having a primary winding connected between the other pair of diagonally opposite terminals, said primary winding having a midtap, the output terminals of said nonlinear bridge circuit being connected respectively to said midtaps whereby said output transformer produces an alternating voltage signal whose magnitude is proportional to said deviations in voltage of said direct current circuit and whose phase depends on the direction of said deviations, means including a unijunction transistor fired by said alternating voltage signal, and means including a silicon controlled rectifier fired by said unijunction transistor for regulating the voltage of said direct current circuit so as to cancel said deviations.

References Cited in the file of this patent

UNITED STATES PATENTS 1,936,407     Palmer _____ Nov. 21, 1933
2,025,158     Cowan _____ Dec. 24, 1935

OTHER REFERENCES

G.E. Controlled Rectifier Manual (1st ed., March 21, 1960), pages 7 and 61 relied on.